(12) United States Patent  
Sato et al.

(10) Patent No.: US 7,337,450 B2
(45) Date of Patent: Feb. 26, 2008

(54) ELECTRONIC APPARATUS

(75) Inventors: Nobuhiro Sato, Yamato (JP); Masatoshi Wakitani, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 589 days.

(21) Appl. No.: 10/634,241

(22) Filed: Aug. 5, 2003

(65) Prior Publication Data

US 2004/0027961 A1 Feb. 12, 2004

(30) Foreign Application Priority Data

Aug. 6, 2002 (JP) .......................... P.2002-228900
Jul. 16, 2003 (JP) .......................... P.2003-275216
Jul. 16, 2003 (JP) .......................... P.2003-275217

(51) Int. Cl.
G11B 33/02 (2006.01)
(52) U.S. Cl. .................................... 720/647
(58) Field of Classification Search ............... 369/75.1; 720/646, 647, 655
See application file for complete search history.

(56) References Cited

U.S. PATENT DOCUMENTS

| | | | | |
|---|---|---|---|---|
| 5,848,042 A | * | 12/1998 | Takahashi et al. | 720/647 |
| 5,862,468 A | * | 1/1999 | Kim | 455/321 |
| 5,941,615 A | | 8/1999 | Ito et al. | |
| 6,398,168 B1 | * | 6/2002 | O Tae | 248/27.3 |
| 6,690,574 B2 | * | 2/2004 | Kasahara et al. | 361/683 |
| 2001/0013744 A1 | | 8/2001 | Jakel | |
| 2003/0193871 A1 | * | 10/2003 | Tobishima et al. | 369/75.1 |
| 2004/0205792 A1 | * | 10/2004 | Kim et al. | 720/655 |

FOREIGN PATENT DOCUMENTS

| | | |
|---|---|---|
| DE | 42 33 567 A1 | 8/1993 |
| EP | 0 928 720 A2 | 7/1999 |
| EP | 0 995 635 A2 | 4/2000 |
| EP | 1 239 481 A2 | 9/2002 |
| JP | 63-53144 | 3/1988 |
| JP | 05-063375 | 3/1993 |
| JP | 2001-230556 | 8/2001 |
| JP | 2001-267755 | 9/2001 |
| JP | 2001-303839 | 10/2001 |
| JP | 2001-339774 | 12/2001 |
| JP | 2002-347529 | 12/2002 |
| WO | WO 00/34079 | 6/2000 |

* cited by examiner

*Primary Examiner*—William Korzuch
*Assistant Examiner*—Mark Blouin
(74) *Attorney, Agent, or Firm*—Pearne & Gordon LLP

(57) ABSTRACT

When a sliding plate slides forward by the rotating force of a motor, the lower part of a movable member is driven and the movable member set in a vertical state moves forward with the vertical state maintained, and the movable member is then rotated and inclined. When the movable member is to be rotated, consequently, the upper and lower wall surfaces of the movable member do not abut on the internal wall surface of a front concave portion of frame members so that the rotation of the movable member is not hindered. Therefore, it is possible to provide an electronic apparatus having a movable member to be used in an on-vehicle acoustic apparatus and rotating a movable member to be accommodated in a frame member even if a clearance between the concave portion of the frame member and the movable member is reduced.

19 Claims, 15 Drawing Sheets

ELECTRONIC APPARATUS

BACKGROUND OF THE INVENTION

1. Field of the Invention

The present invention relates to an electronic apparatus to be used for an on-vehicle video acoustic apparatus.

2. Description of the Related Art

A conventional on-vehicle acoustic apparatus having a movable display section has been described in JP-A-5-63375, for example. In FIG. 21, numeral "1" denotes a frame member attached to the front surface of a housing and a movable member 3 is accommodated in a front concave space 2 of the frame member 1. The movable member 3 is provided with a liquid crystal display and an operation switch. A guide groove 4 is formed in a vertical direction on the left and right internal wall surfaces of the front concave space 2 of the frame member 1. Numeral "5" denotes a shaft provided in the upper parts of the left and right side surfaces of the movable member 3. The shaft 5 is inserted in the guide groove 4 of the front concave space 2. A sliding plate 6 is slidably supported on the inner bottom faces of the housing and the frame member 1. The sliding plate 6 longitudinally slides by a driving mechanism provided in the housing. The driving mechanism includes a motor and a gear mechanism for transmitting the rotation of the motor, and a rack formed on the sliding plate 6 is engaged with the gear mechanism of the driving mechanism. For this reason, when the motor is rotated, the rotating force is transmitted to the rack through the gear mechanism so that the sliding plate 6 slides forward. When the motor is reversely rotated, moreover, the sliding plate 6 slides backward. Numeral "7" denotes a shaft provided in the lower parts of the left and right side surfaces of the movable member 3. The shaft 7 is inserted in the hole of a front end 6A of the sliding plate 6. More specifically, the lower part of the movable member 3 and the front end 6A of the sliding plate 6 are connected to each other through the shaft 7.

In FIG. 21, numeral "6R" denotes a position of the front end 6A in the case in which the sliding plate 6 slides most backward. In the case in which the sliding plate 6 slides most backward, the movable member 3 is positioned almost vertically and the shaft 5 is positioned close to the upper end of the guide groove 4. When the sliding plate 6 is moved forward in this state, the lower part of the movable member 3 is driven forward so that the shaft 5 in the upper part of the movable member 3 is guided into the guide groove 4 and is moved downward at the same time. For this reason, the movable member 3 is inclined in the vertical state with the forward sliding of the sliding plate 6. Numeral "6F" denotes a position of the front end 6A in the case in which the sliding plate 6 slides most forward. In the case in which the sliding plate 6 slides most forward, the movable member 3 is brought into an almost horizontal state. In FIG. 21, the inclining state of the movable member 3 with the sliding of the sliding plate 6 is sequentially displayed. In the case in which the movable member 3 is set in the vertical state, a CD insertion port and a cassette insertion port are closed by the movable member 3. When the movable member 3 is brought into an almost horizontal state, the CD insertion port and the cassette insertion port are opened so that a CD and a cassette can be inserted from a front part into the CD insertion port and the cassette insertion port.

FIG. 22 shows the front of the conventional on-vehicle acoustic apparatus. In FIG. 22, numeral "1" denotes a frame member and the movable member 3 is inclinably accommodated in the front concave space 2 of the frame member 1.

JP-A-5-63375 and JP-A-2002-347529 are known as reference documents.

In the conventional on-vehicle acoustic apparatus, however, a clearance 8 has to be provided between the internal wall surface of the front concave space 2 of the frame member 1 and the outer peripheral surface of the movable member 3 as shown in FIGS. 21 and 22. The movable member 3 having a predetermined thickness is rotated around the shaft 5 with the movement of the sliding plate 6. If the clearance 8 is small, therefore, the upper and lower wall surfaces of the movable member 3 hit on the upper and lower wall surfaces of the front concave space 2 so that the movable member 3 cannot be rotated. For this reason, in the conventional example, the predetermined clearance 8 has to be provided between the internal wall surface of the front concave space 2 of the front member 1 and the outer peripheral surface of the movable member 3. Dust enters the apparatus through the clearance 8 so that failures may be caused. In a recent car, moreover, an enhancement in the feeling of high grade of an interior has been demanded. There is also a problem in that the feeling of high grade of the interior is damaged and the value of the car is reduced if a clearance such as the clearance 8 is large.

SUMMARY OF THE INVENTION

An object of the invention is to provide an electronic apparatus capable of reducing a clearance between a movable member and an apparatus body such as a frame member.

The invention provides an electronic apparatus having a frame member attached to a front part of an apparatus body; a movable member accommodated inside the frame member; and driving means for moving the movable member, wherein the movable member is rotated around a first shaft, and an initial movement from an accommodation position of the movable member by the driving means has a movement component in a forward direction with respect to the apparatus body at a position of the first shaft and a position of a front end which is opposite to the first shaft.

According to the structure, as a clearance between the frame member and the movable member can be reduced, a failure caused by the invasion of dust or things like can be prevented. Moreover, the clearance between the frame member and the movable member can be almost eliminated, the frame member and the movable member look integral so that an appearance can be enhanced.

Moreover, the first shaft and the front end of the movable member initially move in parallel each other, when the movable member moves from an accommodation position.

According to the structure, as the movable member initially moves from the accommodation position, the first shaft and the front end of the movable member moves in parallel each other, the movable member can be moved forward in a state that an attitude in the accommodation position of the movable member is held.

Moreover, the driving means includes a sliding member for moving a lower part of the movable member in forward and backward directions, and the first shaft is rotatably coupled to the sliding member.

According to the simple structure, it is possible to move the movable member forward, for example, in a horizontal direction and to then rotate the movable member.

Moreover, the movable member has a second shaft in both side portions, and the frame member has a guide groove for slidably guiding the second shaft.

According to the simple structure, the movable member can be rotated after it is moved forward, for example, in a horizontal direction.

Furthermore, the electronic apparatus, further having further having energizing means for forward energizing the second shaft side of the movable member in the accommodation position.

According to the structure, when the movable member initially moves forward, it can be prevented from being rotated unnecessarily and abutting on the frame member.

Moreover, the energizing means is a spring member.

According to the simple structure, when the movable member initially moves forward, an unnecessary rotation can be prevented.

Moreover, the guide groove has an upper end for guiding the second shaft in a forward direction with respect to the apparatus body.

According to the simple structure, the movable member can be rotated after it is moved forward, for example, in a horizontal direction.

Moreover, the driving means includes a sliding member for moving a lower part of the movable member in forward and backward directions, the first shaft is rotatably coupled to the sliding member, the movable member has a second shaft in both side portions, the frame member has a guide groove for slidably guiding the second shaft, and the front end of the movable member, the second shaft, and the first shaft are positioned from a forward side to a rearward side of the apparatus body in this order.

According to the structure, as the movable member can be rotated after it is moved forward, for example, in a forward and upper direction, it can be prevented from abutting on the frame member.

Moreover, the movable member has a projection, the frame member has a guide groove in a position corresponding to the projection of an internal wall surface, and the projection is inserted into the guide groove when the movable member comes to be accommodated.

According to the simple structure, a looseness can be prevented in the accommodation of the movable member and the movable member can also be positioned well.

Furthermore, the electronic apparatus further has a rubber pad on an opposed surface of the guide groove.

According to the simple structure, a looseness can be reliably prevented in the accommodation of the movable member and the movable member can also be positioned well.

The invention provides a movable member driving method in an electronic apparatus having a frame member attached to a front part of an apparatus body, a movable member accommodated inside the frame member to be rotated around a first shaft, and driving means for moving the movable member, when the movable member moves from an accommodation position, having the steps of moving the first shaft and a front end, which is opposite to the first shaft, of the movable member in a forward direction with respect to the apparatus body; and rotating the movable member around the first shaft.

According to this method, it is possible to rotate the movable member while accommodating the movable member inside the frame member without a clearance.

The invention provides a movable member positioning method in an electronic apparatus having a frame member attached to a front part of an apparatus body, a movable member accommodated inside the frame member to be rotated around a first shaft, and driving means for moving the movable member, with using a jig having parallel protruded pieces to abut on an inside surface of the frame member, having the steps of inserting the protruded pieces of the jig into the frame member from a front of the frame member; inserting the apparatus body including the movable member between the protruded pieces from a rear of the frame member; positioning the movable member with respect to the frame member; and fixing the apparatus body and the frame member.

According to this method, it is possible to easily fix the movable member inside the frame member to form a clearance evenly on the left and right.

According to the invention, it is possible to provide an electronic apparatus in which a clearance between the movable member and the apparatus body such as a frame member is reduced because the movable member initially moves in the forward direction with respect to the apparatus body.

The invention provides an electronic apparatus having a frame member attached to a front part of an apparatus body; a movable member movably supported on an inside of the frame member; and driving means for driving the movable member, wherein the movable member is rotated while a lower part of the movable member moves in forward and backward directions of the apparatus body by a driving operation of the driving means to open and close the front part of the apparatus body, and an upper end is displaced in only a downward direction in a vertical direction of the apparatus body when the movable member in the most erected state is rotated.

According to the structure, when the movable member is rotated in the most erected state, the upper end of the movable member is not displaced in an upward direction in the vertical direction of the apparatus body. Therefore, the movable member neither abuts on nor interferes with members of the apparatus body such as a frame member, so that the rotation of the movable member can be prevented from being hindered. Accordingly, it is possible to reduce the clearance between the members of the apparatus body such as the frame member and the movable member.

Moreover, the movable member has a sliding shaft provided on an upper side of both side portions, and a rotating shaft provided on a lower side of the both side portions, the frame member has a guide groove to be inserted the sliding shaft of the movable member and guiding the sliding shaft, and the driving means includes a sliding member coupled to the rotating shaft of the movable member and driving the rotating shaft in the forward and backward directions of the apparatus body.

According to the structure, the movable member drives the sliding member of the driving means in the forward and backward directions of the apparatus body. Consequently, the lower part of the movable member including the rotating shaft provided on the lower side moves in the forward and backward directions of the apparatus body, and at the same time, the sliding shaft provided on the upper side moves along the guide groove provided on both inside parts of the frame member. Consequently, the movable member is rotated around the rotating shaft to open and close the apparatus body. At this time, the upper end of the movable member is not displaced in an upward direction in the vertical direction of the apparatus body. Therefore, the movable member neither abuts on nor interferes with the member of the apparatus body such as the frame member so that the rotation of the movable member can be prevented from being hindered.

Moreover, the rotating shaft of the movable member is positioned in the same place of a top of the upper end or is positioned forward therefrom in the forward and backward directions of the apparatus body in a condition that the movable member is set in the most erected state.

According to the structure, the rotating shaft is positioned in the same place of the top of the upper end or is positioned forward therefrom in the forward and backward directions of the apparatus body in a condition that the movable member is set in the most erected state. When the movable member is rotated in this state, consequently, the upper end of the movable member can be displaced in only a downward direction in the vertical direction of the apparatus body. Accordingly, it is possible to reduce a clearance between the member of the apparatus body such as the frame member and the movable member.

The invention provides an electronic apparatus having a frame member attached to a front part of an apparatus body; a movable member accommodated in the frame member; and driving means for moving the movable member, wherein the movable member is rotated around a first shaft, the movable member moves by a driving operation of the driving means from a position where the movable member is accommodated in a forward direction with respect to the apparatus body in a position of the first shaft, and a component in a direction orthogonal to the forward direction in a position of a front end which is opposite to the first shaft is set in a direction of the first shaft side.

According to the structure, when the movable member is rotated, the front end on the opposite side of the first shaft of the movable member is not displaced in the direction orthogonal to the forward direction of the apparatus body, for example, an upward direction (an opposite direction to the first shaft) in an almost vertical direction. Therefore, it is possible to prevent the movable member from abutting on or interfering with the member of the apparatus body such as the frame member. Thus, it is possible to reduce a clearance between the member of the apparatus body such as the frame member and the movable member.

Moreover, the driving means includes a sliding member for moving a lower part of the apparatus body in forward and backward directions, and the first shaft is rotatably coupled to the sliding member.

According to the simple structure, when the movable member is moved, it is possible to prevent the movable member from abutting on or interfering with the member of the apparatus body such as the frame member. Thus, it is possible to reduce a clearance between the member of the apparatus body such as the frame member and the movable member.

Moreover, the movable member has a second shaft in both side portions, and the frame member has a guide groove for slidably guiding the second shaft.

According to the simple structure, when the movable member is moved, it is possible to prevent the movable member from abutting on or interfering with the member of the apparatus body such as the frame member. Thus, it is possible to reduce a clearance between the member of the apparatus body such as the frame member and the movable member.

Moreover, the driving means includes a sliding member for moving a lower part of the apparatus body in forward and backward directions, the first shaft is rotatably coupled to the sliding member, the movable member has a second shaft in both side portions, the frame member has a guide groove for slidably guiding the second shaft, and the first shaft, the front end of the movable member, and the second shaft are positioned from a forward side to a rearward side of the apparatus body in this order.

According to the structure, when the movable member is rotated, the front end on the opposite side of the first shaft of the movable member can be caused to be displaced only in a direction orthogonal to the forward direction of the apparatus body, for example, a downward direction (a direction of the first shaft side) in an almost vertical direction. Accordingly, it is possible to reduce a clearance between the member of the apparatus body such as the frame member and the movable member.

According to the invention, it is possible to provide an electronic apparatus in which a clearance between the movable member and the apparatus body such as a frame member is reduced because the upper end of the movable member is not displaced in only a downward direction of the apparatus body.

DETAILED DESCRIPTION OF THE PREFERRED EMBODIMENTS

Figure 1:
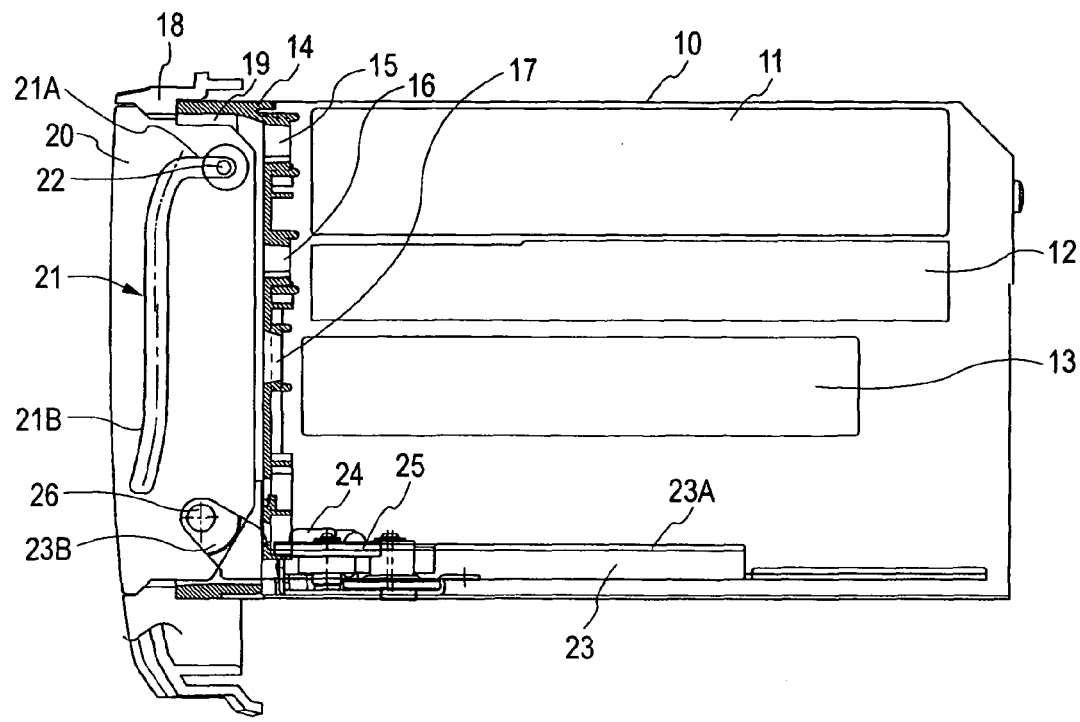
FIG. 1 is a side view showing an electronic apparatus having a movable member according to a first embodiment of the invention.

Embodiments of the invention will be described below with reference to the drawings.

First Embodiment

FIGS. 1 to 5 show an on-vehicle acoustic apparatus according to a first embodiment. In the embodiment, description will be given to an example that an electronic apparatus according to the invention is applied to the on-vehicle acoustic apparatus.

The on-vehicle acoustic apparatus has a housing 10, and a DVD player 11, a CD player 12 and a cassette tape player 13 are accommodated in the housing 10. Furthermore, a radio receiving circuit, an amplifying circuit and things like are accommodated in the housing 10. A first frame member 14 is attached and fixed to the opening portion of the front surface of the housing 10. The first frame member 14 is provided with a DVD insertion port 15 for inserting a DVD, a CD insertion port 16 for inserting a CD and a cassette tape insertion port 17 for inserting a cassette tape. A second frame member 18 is attached and fixed to the front end of the first frame member 14. The first frame member 14 and the second frame member 18 may be provided integrally with the housing 10 of the apparatus body.

A movable member 20 is accommodated in a concave space 19 that is inside and in front of a frame member constituted by the first frame member 14 and the second frame member 18. The movable member 20 is movable in the horizontal direction of the apparatus housing and is rotatable with respect to the first frame member 14 and the second frame member 18. A liquid crystal display and an operation switch are provided on the front surface of the movable member 20.

A guide groove 21 is formed on the left and right internal wall surfaces of the first frame member 14. The guide groove 21 includes an almost horizontal upper end 21A and an arcuate section 21B extended in an almost vertical direction in connection to the upper end 21A. A sliding shaft (a second shaft) 22 is provided in the upper parts of the left and right outside surfaces of the movable member 20. The sliding shaft 22 is inserted into the guide groove 21 and can be moved along the guide groove 21.

A sliding plate 23 as an example of a sliding member is supported on the inner bottom face of the housing 10 to be slid in a horizontal direction. A motor 24 is provided in the vicinity of the sliding plate 23. The sliding plate 23 and the motor 24 are coupled each other through a gear mechanism 25 for conveying the rotating force of the motor 24, and a rack 23A formed on the sliding plate 23 and the gear of the gear mechanism 25 are meshed with each other. In the first embodiment, driving means for driving the movable member 20 is constituted to include the sliding plate 23, the motor 24 and the gear mechanism 25. A rotating shaft (a first shaft) 26 is provided in the lower parts of the left and right outside surfaces of the movable member 20. The rotating shaft 26 is inserted in a hole formed on a front end 23B of the sliding plate 23. The front end 23B of the sliding plate 23 and the lower part of the movable member 20 are coupled each other through the rotating shaft 26 to be rotated.

FIG. 1 shows a state in which the sliding plate 23 is moved most backward. In this state, the sliding shaft 22 is positioned on the end of the horizontal upper end 21A of the guide groove 21, and the movable member 20 is positioned almost vertically. When the motor 24 is rotated in this state, the rotating force of the motor 24 is conveyed to the gear mechanism 25 and the rack 23A of the sliding plate 23 engaged with the gear mechanism 25 is driven so that the sliding plate 23 slides forward. When the sliding plate 23 slides forward, the sliding shaft 22 is guided and moved along the guide groove 21. Since the upper end 21A of the guide groove 21 is formed almost horizontally, the movable member 20 is moved forward with a vertical state maintained. Thus, a point where a top of a front upper section of the movable member 20, which corresponds to a front end as opposite side of the rotating shaft 26 when the movable member 20 moves from a initial state, moves forward almost horizontally from a initial position. At this time, the top of the from upper section of the movable member 20 and the rotating shaft 26 move in parallel each other.

Figure 2:
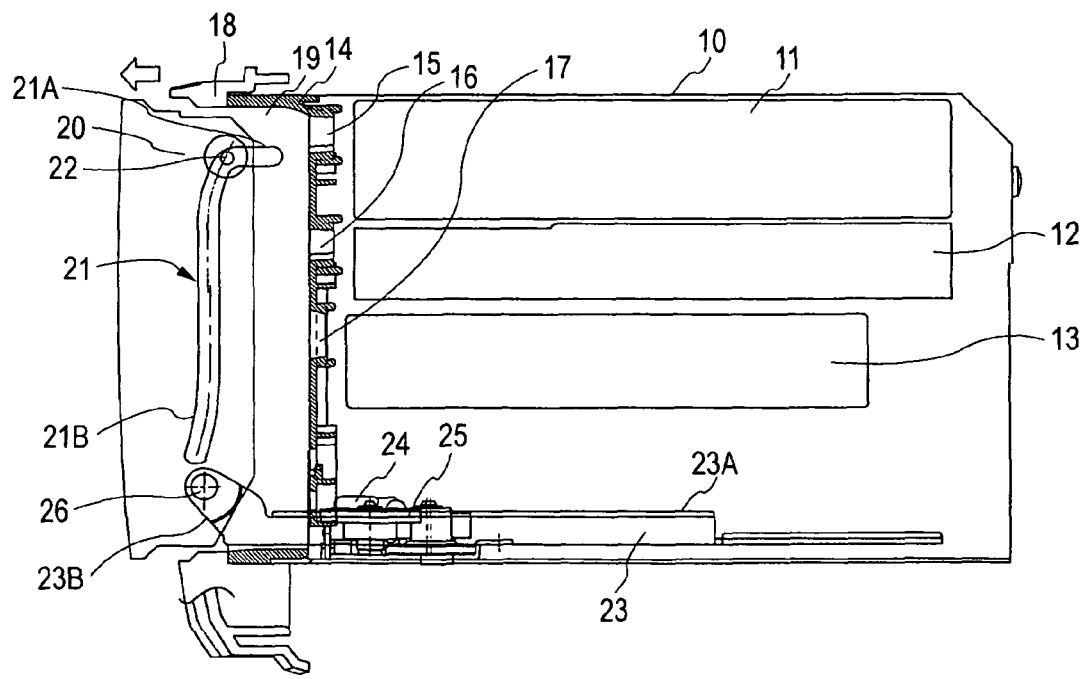
FIG. 2 is a side view showing an operation state according to the first embodiment.
Figure 3:
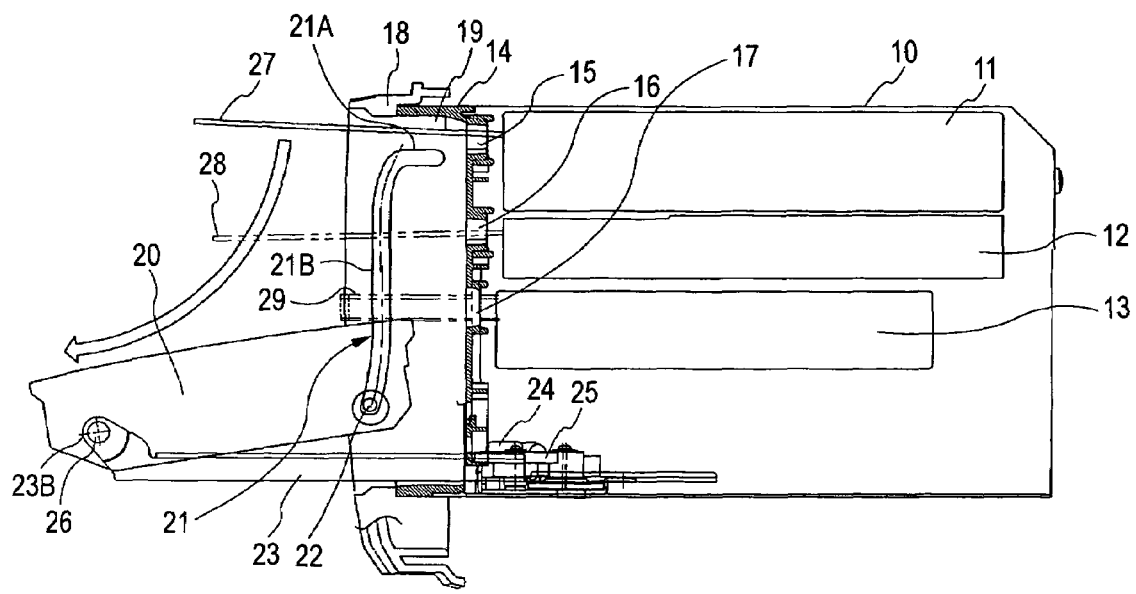
FIG. 3 is a side view showing another operation state according to the first embodiment.
Figure 4:
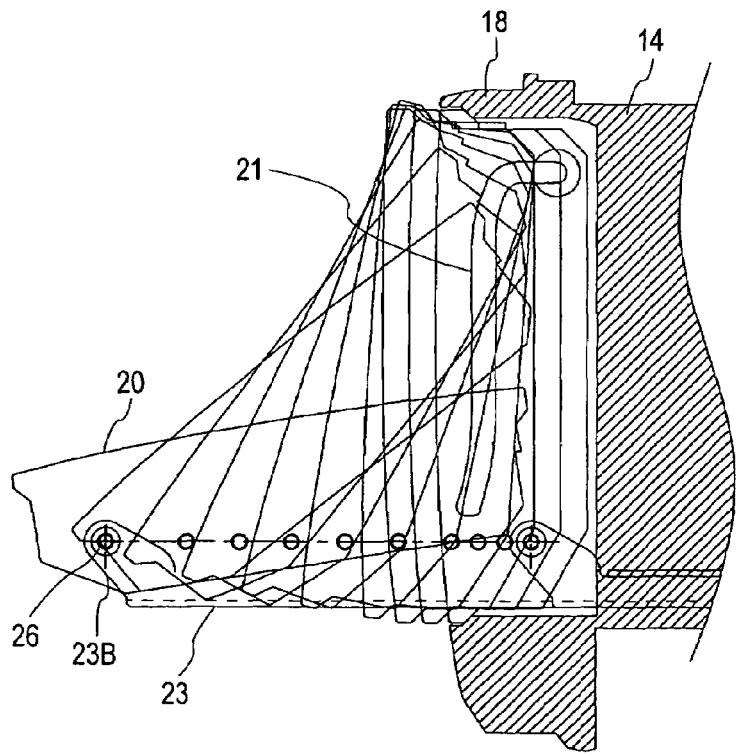
FIG. 4 is a view showing the moving process of a movable member according to the first embodiment.

FIG. 2 shows a state in which the movable member 20 moved forward with the vertical state maintained. When the sliding plate 23 further slides forward in the state shown in FIG. 2, the sliding shaft 22 is guided to the almost vertical arcuate section 21B from the horizontal upper end 21A and the movable member 20 is sequentially inclined as shown in FIG. 4. FIG. 4 shows the moving process of the movable member 20 stepwise. FIG. 3 shows a state in which the sliding plate 23 moved most forward. In this state, the movable member 20 is inclined almost horizontally. When the state shown in FIG. 3 is brought, a DVD insertion port 15, a CD insertion port 16 and a cassette insertion port 17, which were closed by the movable member 20, are opened so that a DVD 27, a CD 28 and a cassette 29 can be inserted and ejected.

Figure 5:
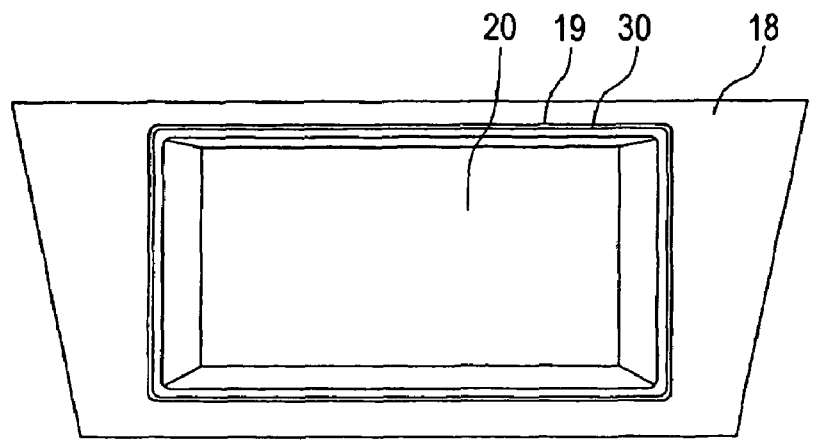
FIG. 5 is a front view showing the first embodiment.
Figure 6:
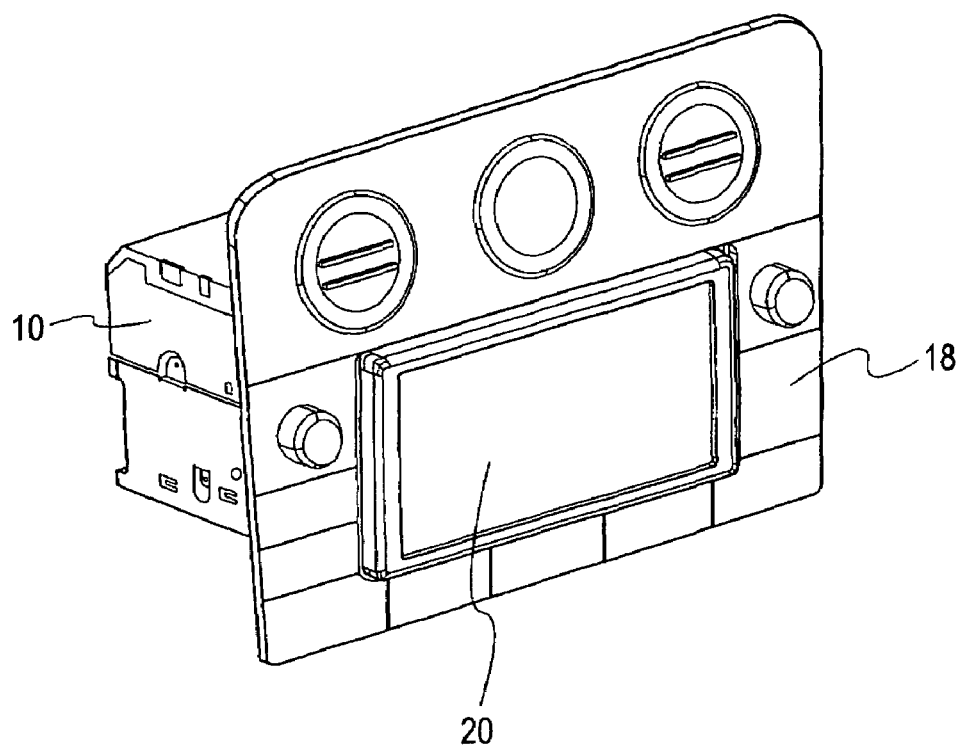
FIG. 6 is a perspective view showing a second embodiment of the invention.
Figure 7:
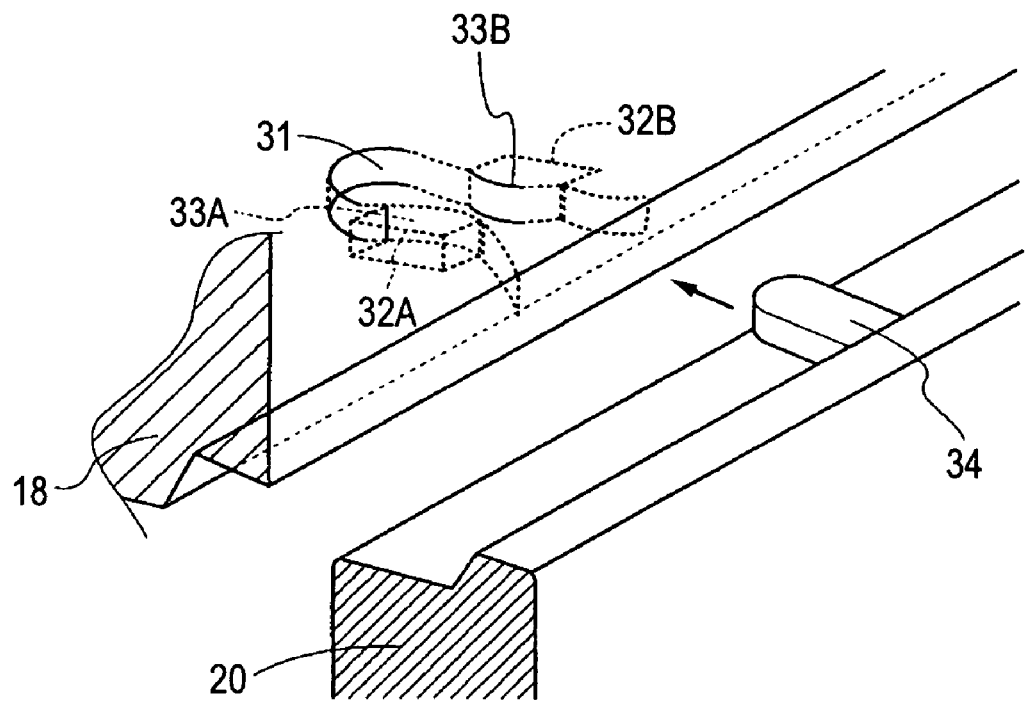
FIG. 7 is a perspective view showing a main part according to the second embodiment.

FIG. 5 shows the front of the on-vehicle acoustic apparatus according to the first embodiment. In the first embodiment, as shown in FIG. 5, it is possible to reduce a clearance 30 between an internal wall surface of the concave portion 19 of the frame member 18 and an outer peripheral surface of the movable member 20 (for example, approximately 0.1 mm).

In the first embodiment, thus, the movable member 20 set in the vertical state is moved forward with the vertical state maintained, and the movable member 20 is then rotated and inclined. When the movable member 20 is rotated, therefore, the upper and lower wall surfaces of the movable member 20 do not abut on the internal wall surface of the front concave portion 19 of the frame members 14 and 18. Accordingly, the rotation of the movable member 20 is not hindered.

When the motor 24 is reversely rotated in the state shown in FIG. 3, the sliding plate 23 moves backward and the movable member 20 is sequentially rotated and is thus brought into the vertical state. When the sliding shaft 22 moves toward the horizontal upper end 21A of the guide groove 21, the movable member 20 moves backward with the vertical state maintained so that the state shown in FIG. 1 is brought.

As described above, according to the first embodiment, the movable member 20 accommodated in the concave space 19 of the frame member 18 is moved forward and is then rotated. Therefore, even if a clearance between the frame member 14 and 18 and the movable member 20 is reduced, the movable member 20 can be rotated and the clearance 30 between the movable member 20 and the frame members 14 and 18 can be reduced greatly (for example, 0.1 mm). Consequently, it is possible to have such an advantage that dusts can be prevented from entering through the clearance 30 and to enhance the grade of the interior of a car.

Second Embodiment

FIGS. 6 to 9 show a second embodiment. In FIGS. 6 to 9, the same portions as those in the first embodiment shown in FIGS. 1 to 5 have the same reference numerals.

In FIGS. 6 to 9, numeral "31" denotes a guide groove formed on the internal wall surface in the upper part of a frame member 18. Concave portions 32A and 32B are formed on both wall surfaces in the middle part of the guide groove 31, and rubber pads 33A and 33B are attached to the concave portions 32A and 32B. The opposed surfaces of the rubber pads 33A and 33B are arcuate surfaces. The same guide groove is formed on an internal wall surface in the lower part of the frame member 18. Numeral "34" denotes a projection formed on the upper surface of a movable member 20, and the same projection is formed on the lower surface of the movable member 20.

Figure 8:
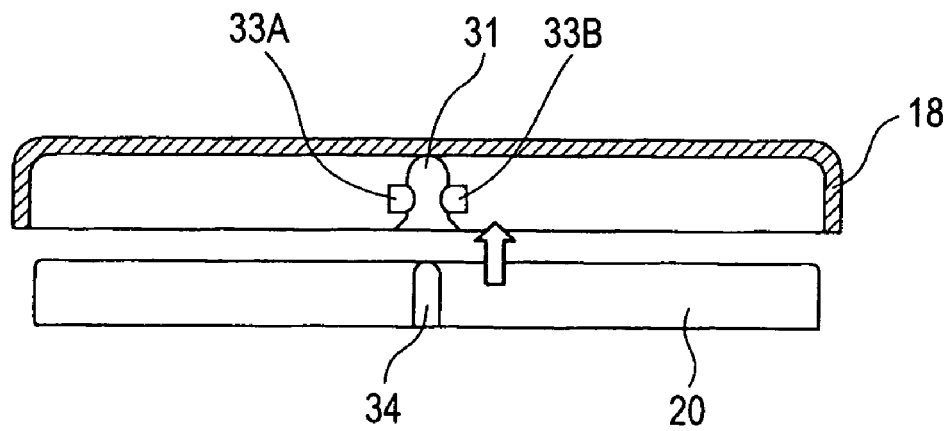
FIG. 8 is an explanatory view showing an operation according to the second embodiment.
Figure 9:
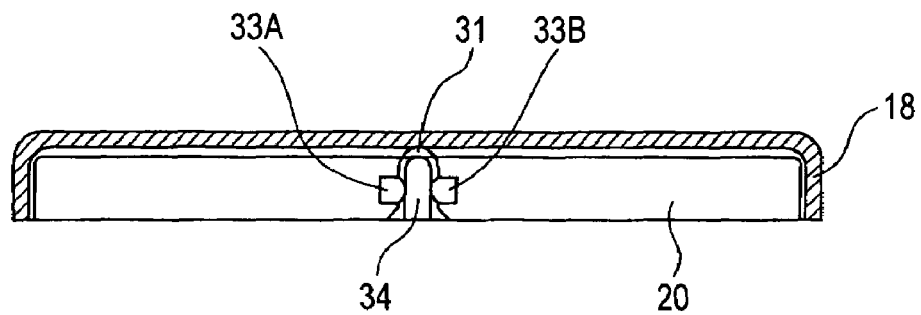
FIG. 9 is an explanatory view showing the operation according to the second embodiment.

When a sliding plate 23 moves backward and then moves into a front concave portion 19 of the frame member 18 with the movable member 20 set in an almost vertical state as shown in FIG. 8, the projection 34 of the movable member 20 enters into the guide groove 31 of the frame member 18 and is interposed between the rubber pads 33A and 33B. Therefore, the looseness of the movable member 20 can be prevented in the application of a vibration.

Third Embodiment

Figure 10:
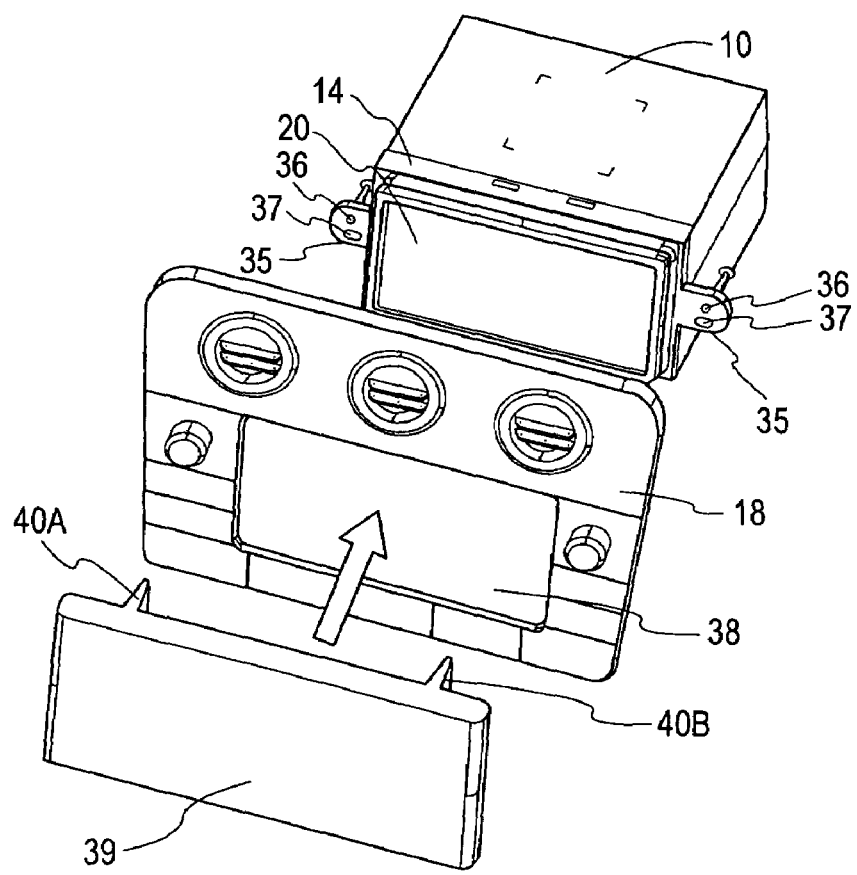
FIG. 10 is an exploded perspective view showing a third embodiment of the invention.
Figure 11:
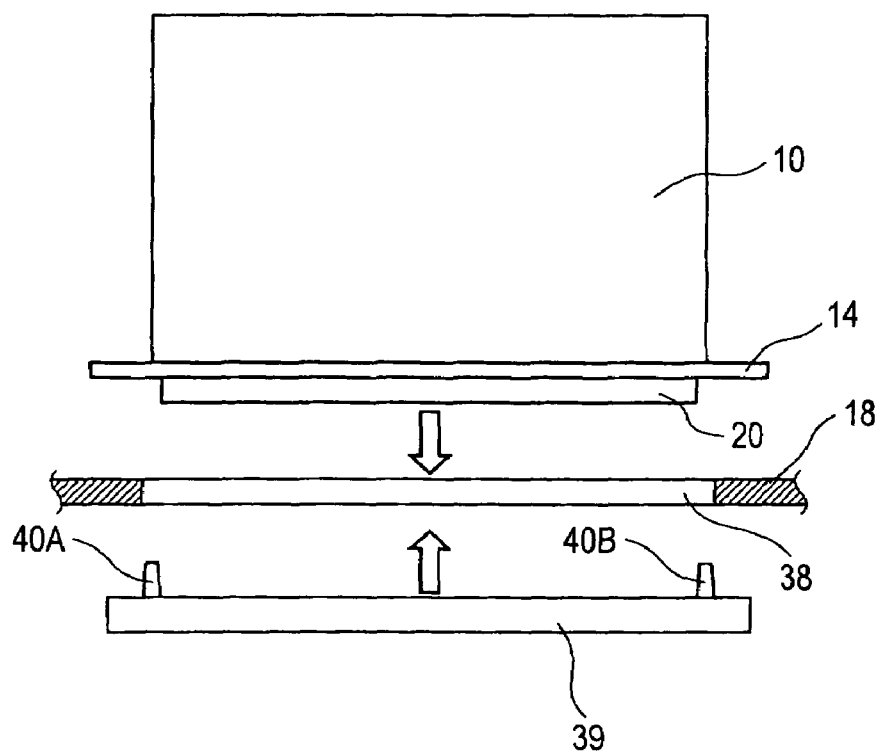
FIG. 11 is an explanatory view showing an operation according to the third embodiment of the invention.
Figure 12:
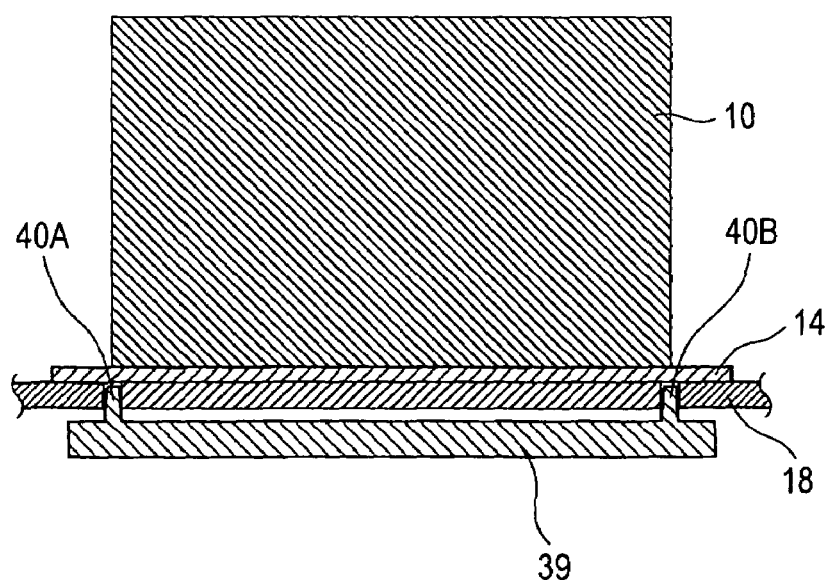
FIG. 12 is an explanatory view showing the operation according to the third embodiment of the invention.

FIGS. 10 to 12 show a third embodiment. In FIG. 10, numeral "10" denotes a housing, numeral "20" denotes a movable member supported on a first frame member 14 of the housing 10 to be rotated, and numeral "35" denotes an attachment piece formed on the left and right of the first frame member 14. A screw hole 36 and a positioning slot 37 are formed on the attachment piece 35. Numeral "18" denotes a second frame member. The movable member 20 is inserted into a square hole 38 on the center of the frame member 18. Numeral "39" denotes a jig. Protruded pieces 40A and 40B having triangular sections are formed on the back surface of the jig 39 in parallel. In the case that a body including the housing 10, the frame member 14 and the movable member 20 is attached to the frame member 18, the body is inserted from the back side of the square hole 38 of the frame member 18 and the protruded pieces 40A and 40B of the jig 39 are inserted from the surface side of the square hole 38 as shown in FIG. 11. FIG. 12 shows a positioning state. The protruded piece 40A on the left side of the jig 39 is interposed between the left internal wall surface of the square hole 38 of the frame member 18 and the left external wall surface of the frame member 14. The protruded piece 40B on the left side of the jig 39 is interposed between the right internal wall surface of the square hole 38 of the frame member 18 and the right external wall surface of the frame member 14. By utilizing a screw fixed into the screw hole 36 in this state, the body is fastened to the frame member 18.

According to the third embodiment, it is possible to easily fix the body can into the frame member 18 to form a clearance evenly on the left and right.

Fourth Embodiment

Figure 13:
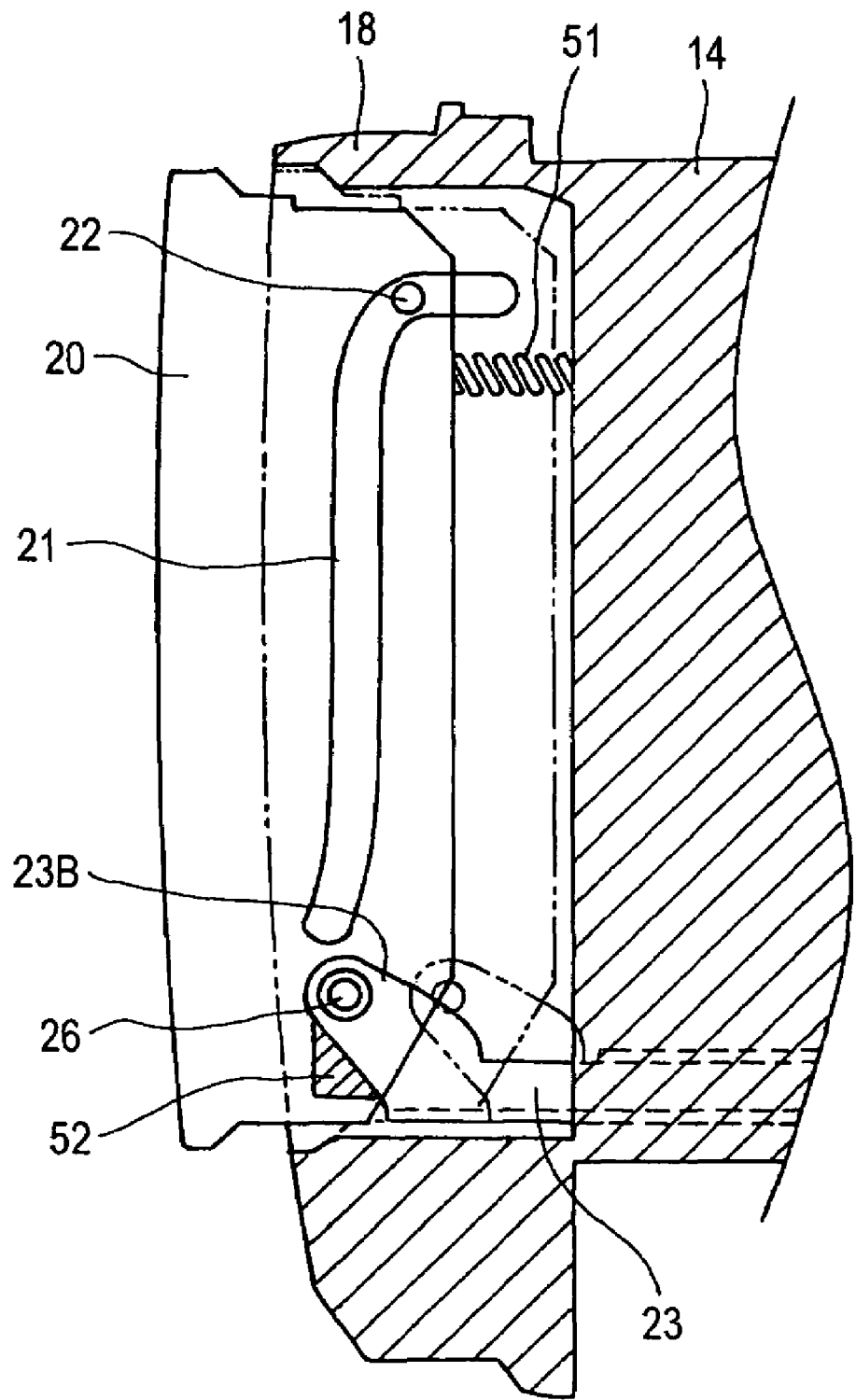
FIG. 13 is an explanatory view showing a structure according to a fourth embodiment of the invention.

FIG. 13 shows a fourth embodiment. In the fourth embodiment, an energizing member 51 as an example of energizing means for energizing the upper part of a movable member 20 in the forward direction of the apparatus is provided between the vicinity of a sliding shaft 22 in the upper part of the movable member 20 and the first frame member 14, in addition to the structure according to the first embodiment shown in FIGS. 1 to 5. The energizing member 51 is constituted by an elastic member such as a spring member, for example, a winding spring or a leaf spring, having energizing force by an elasticity in a predetermined direction. Moreover, a stopper member 52 for preventing the upper part of the movable member 20 from being rotated in a forward direction (counterclockwise in the drawing) is provided in the vicinity of a rotating shaft 26 in the lower part of the movable member 20. The stopper member 52 has such a structure as to abut on a front end 23B of a sliding plate 23 when the movable member 20 is set in an almost vertical state, thereby controlling the rotating range of the movable member 20.

In the fourth embodiment, thus, the energizing member 51 and the stopper member 52 are provided so that the vertical state of the movable member 20 can be reliably maintained when the movable member 20 moves forward in a horizontal direction in such an initial condition that the movable member 20 moves from the state shown in FIG. 1. Accordingly, it is possible to prevent the movable member 20 from being rotated unnecessarily. Also even if a looseness is generated between a guide groove 21 and the sliding shaft 22, for example, the upper end of the movable member 20 can be prevented from abutting on a second frame member 18 and the first frame member 14. Consequently, the movable member 20 can be moved smoothly to carry out opening and closing.

Fifth Embodiment

Figure 14:
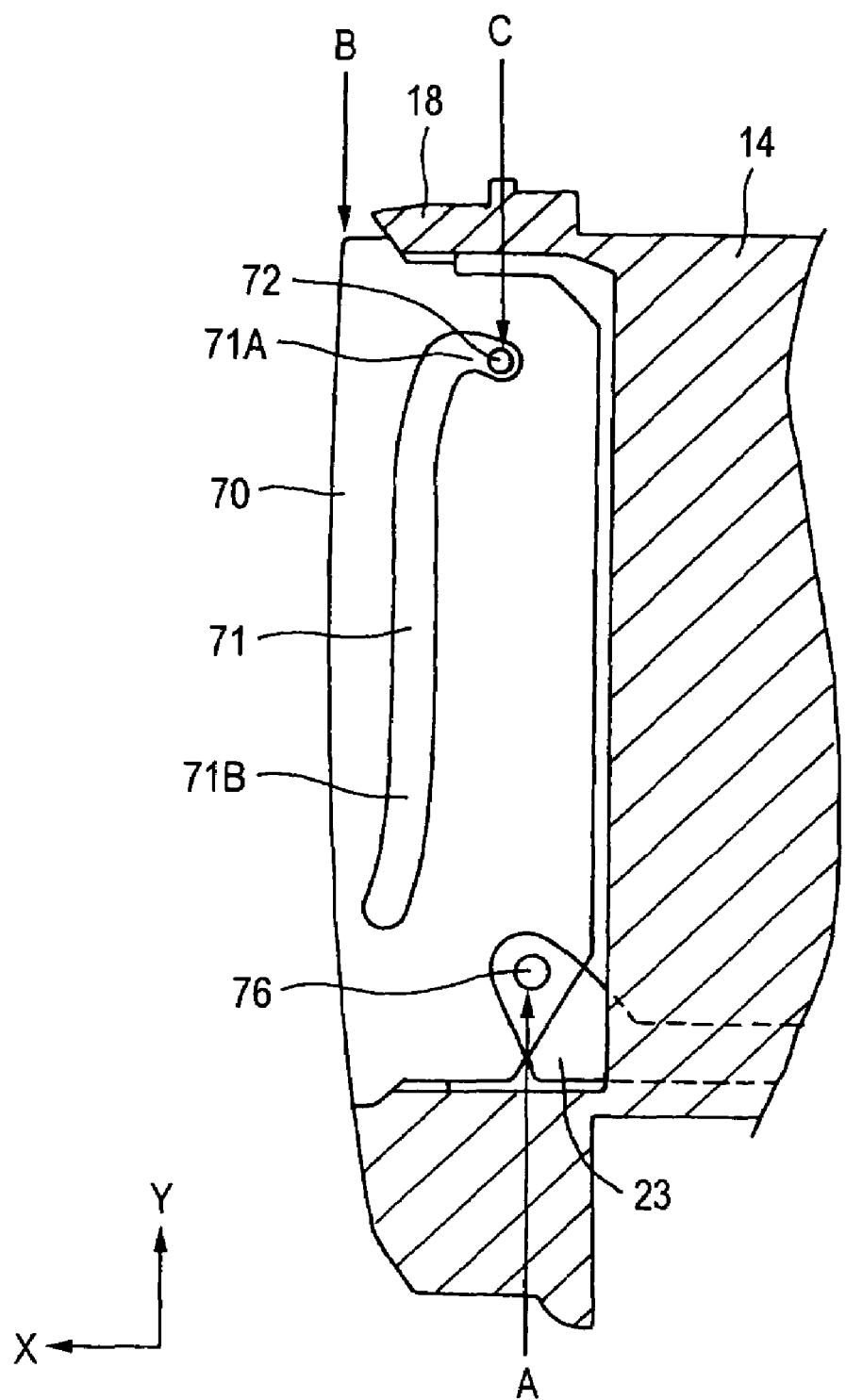
FIG. 14 is an explanatory view showing a structure according to a fifth embodiment of the invention.

FIG. 14 shows a fifth embodiment. In the fifth embodiment, arrangement and construction of a guide groove 71, a sliding shaft 72 and a rotating shaft 76 of a movable member 70 is changed. The guide groove 71 of the movable member 70 has an upper end portion 71A inclined forward and upward with respect to the apparatus body and an arcuate portion 71B bent and extending downward substantially vertically from the upper end portion 71A. A sliding shaft 72 is provided in the upper parts of the left and right outside surface of the movable member 70. The sliding shaft 72 is inserted into the guide groove 71 and can be moved along the guide groove 71. A rotating shaft 76 is provided in the lower parts of the left and right outside surface of the movable member 70. The sliding plate 23 and the lower of the movable member 70 are rotatablly coupled each other through the rotating shaft 76.

When the movable member 70 is in accommodation position as shown in FIG. 14, point A where the rotating shaft 76 is positioned, point B where the top of a front end, which is opposite to the rotating shaft 76, of the movable member, and point C where the sliding shaft 72 is positioned are positioned in the order of B, C and A as viewed from the front of the device in the direction X in FIG. 14. They have a positional relationship which can be expressed as B>C>A. The rotating shaft 76 moves forward by a driving operation of the driving means while the sliding shaft 72 moves along the guide groove 71. According to the structure, when the movable member 70 begins to move, the sliding shaft 72 is guided along the upper end portion 71A of the guide groove 71 and the front top (point B) of the movable member 70 moves forward and slightly upward. Subsequently, the sliding shaft 72 is guided slightly downward along the arcuate portion 71B of the guide groove 71. As a result, the movable member 70 is rotated around the rotating shaft 76 and is gradually inclined.

In the fifth embodiment, thus, the initial movement direction from the accommodation position of the movable member 70 has a movement component in a forward direction with respect to the apparatus body, and the movable member 70 moves forward and slightly upward, then is rotated. Even if the clearance between the internal wall surface of the first frame member 14 and the second frame member 18 and the outer surface of the movable member 70 is reduced, it is possible to prevent the front upper end of the movable member 70 from abutting on the first frame member 14 and the second frame member 18 so that the movable member 70 is rotatable. Thus, it is possible to reduce the clearance between the first and second frame members 14 and 18 and the movable member 70.

Sixth Embodiment

FIGS. 15 to 20 are views showing the structure of an on-vehicle acoustic apparatus for explaining a sixth embodiment of the invention. FIGS. 15 to 18 show the schematic structure of the on-vehicle acoustic apparatus according to the sixth embodiment as seen from a side surface. In the sixth embodiment, description will be given to an example that an electronic apparatus according to the invention is applied to the on-vehicle acoustic apparatus.

The on-vehicle acoustic apparatus has a housing 110, and a DVD player 111, a CD player 112 and a cassette tape player 113 are accommodated in the housing 110. Furthermore, a radio receiving circuit, an amplifying circuit and things like are accommodated in the housing 110. A first frame member 114 is attached and fixed to the opening portion of the front surface of the housing 110. The first frame member 114 is provided with a DVD insertion port 115 for inserting a DVD, a CD insertion port 116 for inserting a CD and a cassette tape insertion port 117 for inserting a cassette tape. A second frame member 118 is attached and fixed to the front end of the first frame member 114. The first frame member 114 and the second frame member 118 may be provided integrally with the housing 110 of the apparatus body.

Figure 15:
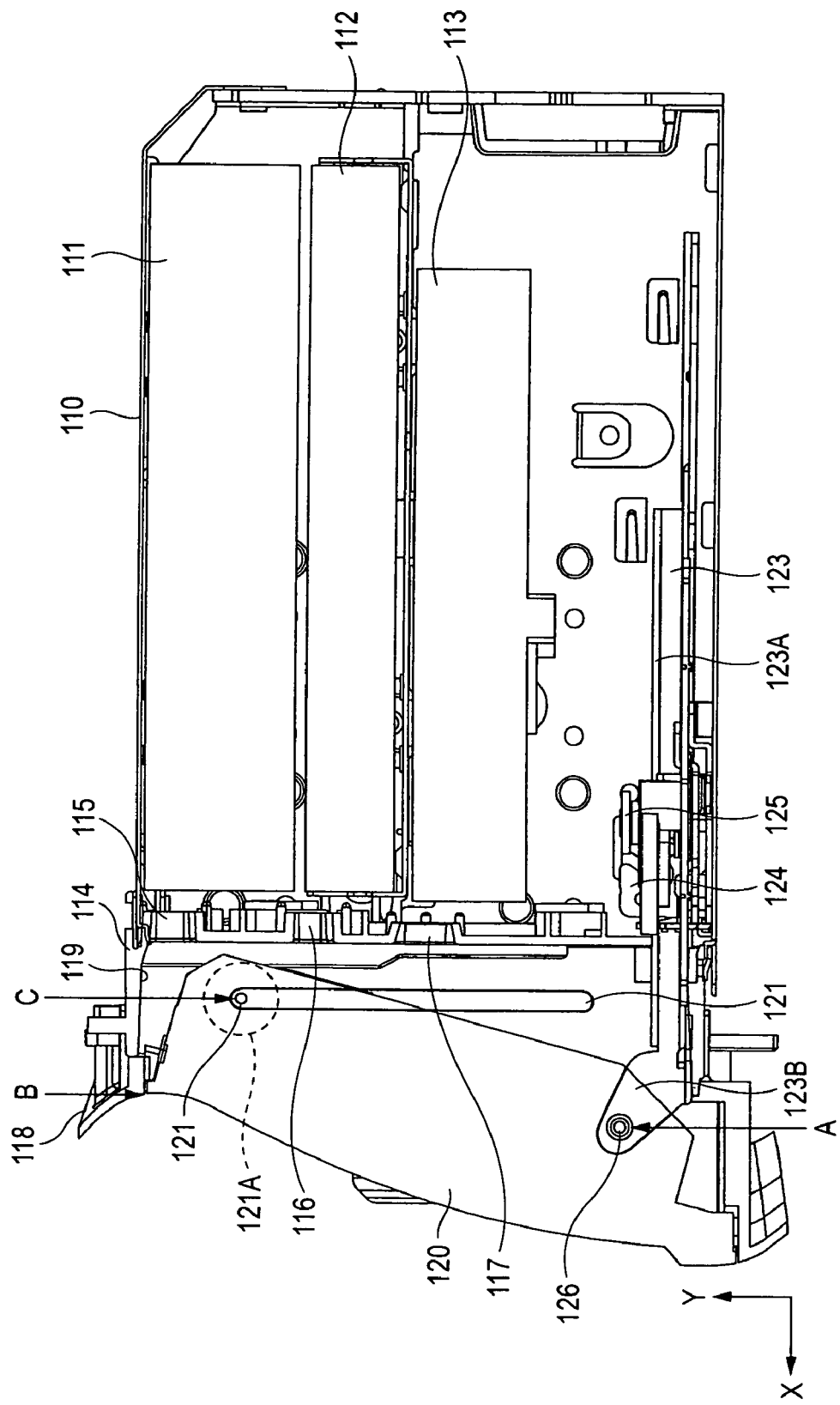
FIG. 15 is a view showing the structure of an on-vehicle acoustic apparatus for explaining a sixth embodiment of the invention.
Figure 17:
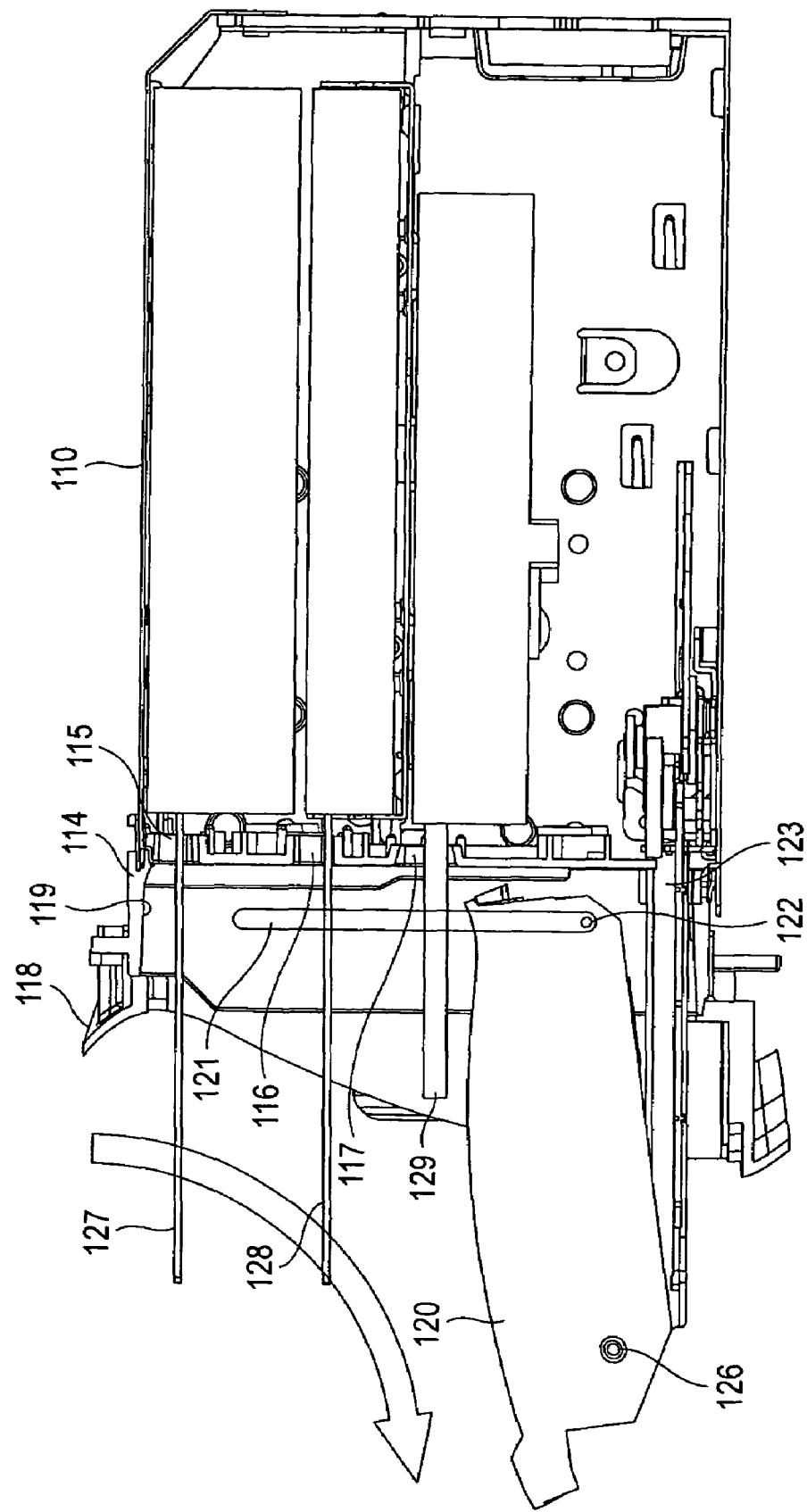
FIG. 17 is a side view showing another operation state according to the sixth embodiment.

A movable member 120 is accommodated in a concave space 119 that is inside and in front of a frame member constituted by the first frame member 114 and the second frame member 118. The movable member 120 is rotatable with respect to the first frame member 114 and the second frame member 118. A lower part of the movable member 120 is constituted to move in the forward direction of the on-vehicle acoustic apparatus. A liquid crystal display and an operation switch are provided on the front surface of the movable member 120. FIGS. 15 and 17 show only the external shape of the movable member 120 for easy understanding.

A guide groove 121 is formed on the left and right internal wall surfaces of the first frame member 114. The guide groove 121 is straight or almost straight and is vertical or almost vertical to the horizontal plane of the housing 110. The shape of the guide groove 121 is not restricted to that shown in the drawing, That is, the guide groove 121 may have a curve portion at least in part or may be oblique to the horizontal plane of the housing 110. A sliding shaft (a second shaft) 122 is provided in the upper parts of the left and right outside surfaces of the movable member 120. The sliding shaft 122 is inserted into the guide groove 121 and can be moved along the guide groove 121.

A sliding plate 123 as an example of a sliding member is supported on the inner bottom face of the housing 110 to be slid in a horizontal direction. A motor 124 is provided in the vicinity of the sliding plate 123. The sliding plate 123 and the motor 124 are coupled each other through a gear mechanism 125 for conveying the rotating force of the motor 124, and a rack 123A formed on the sliding plate 123 and the gear of the gear mechanism 125 are meshed with each other. In the sixth embodiment, driving means for driving the movable member 120 is constituted to include the sliding plate 123, the motor 124 and the gear mechanism 125. A rotating shaft (a first shaft) 126 is provided in the lower parts of the left and right outside surfaces of the movable member 120. The rotating shaft 126 is inserted in a hole formed on a front end 123B of the sliding plate 123. The front end 123B of the sliding plate 123 and the lower part of the movable member 120 are coupled each other through the rotating shaft 126 to be rotated.

FIG. 15 shows a state in which the sliding plate 123 is moved most backward. In this state, the sliding shaft 122 is positioned on the end of an upper section 121A of the guide groove 121, and the movable member 120 is brought into the most erected state and is almost wholly accommodated inside the second frame member 118. In this state, referring to the positional relationship in X-direction of FIG. 15 between a point A where the rotating shaft 126 is positioned and a point B where the top of the upper end of the front surface of the movable member 120, which is positioned on the other side of the rotating shaft 126, is placed, the point A and the point B are placed in the same position or the point A is positioned forward from the point B (that is, A≧B). Referring to the positional relationship between the point A where the rotating shaft 126 is positioned and a point C where the sliding shaft 122 is positioned, the point A is positioned forward from the point C (that is, A>C).

Figure 16:
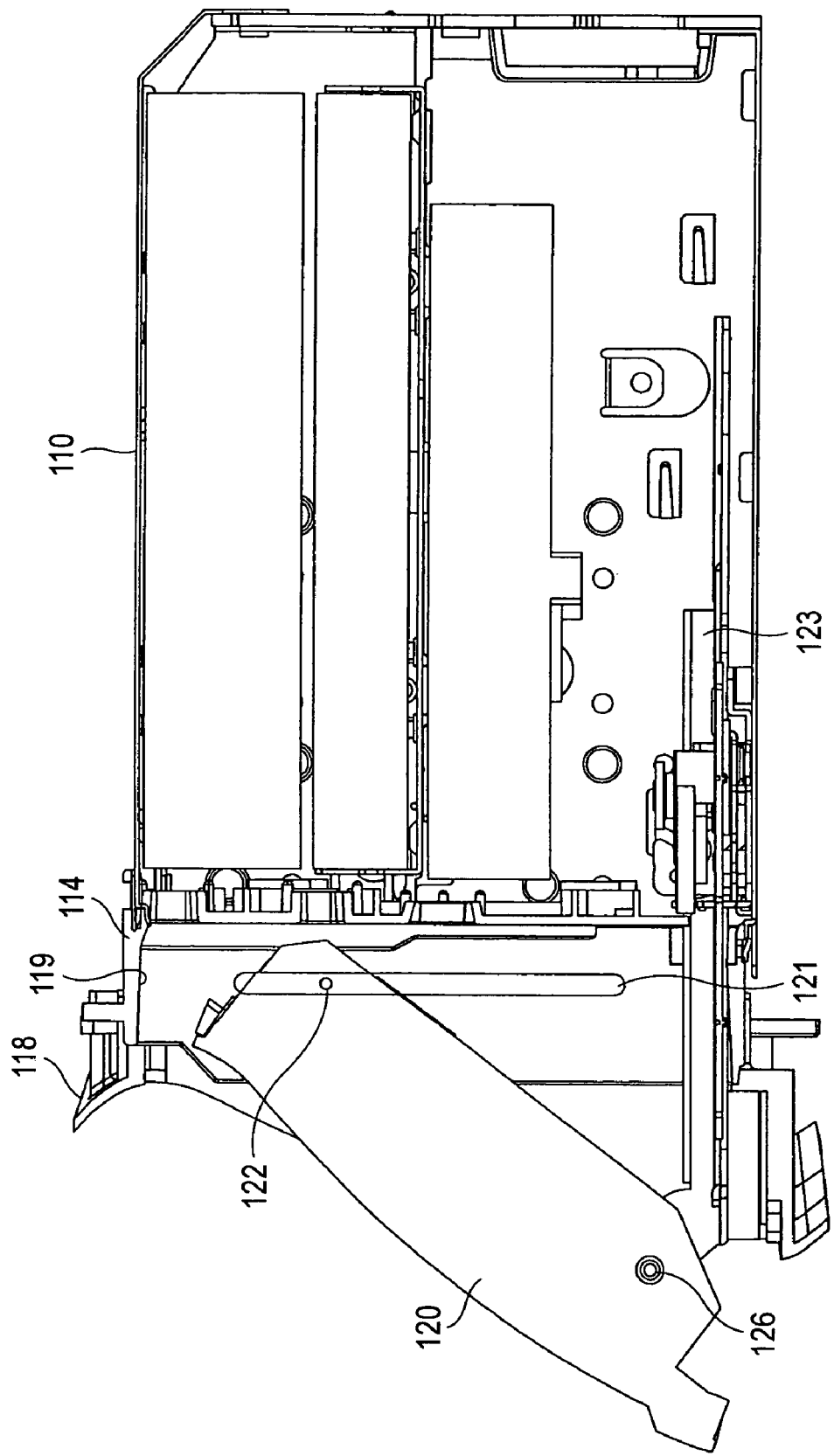
FIG. 16 is a side view showing an operation state according to the sixth embodiment.

When the motor 124 is rotated in the state shown in FIG. 15, the rotating force of the motor 124 is conveyed to the gear mechanism 125 and the rack 123A of the sliding plate 123 to be meshed with the gear mechanism 125 is driven so that the sliding plate 123 slides forward. FIG. 16 shows a middle state in which the sliding plate 123 slides forward so that the movable member 120 is rotated. The positions of the rotating shaft 126 and the sliding shaft 122 in the movable member 120 are fixed and their distance is invariable. As shown in FIG. 16, when the sliding plate 123 slides forward, the rotating shaft 126 correspondingly moves forward so that the sliding shaft 122 is guided by the guide groove 121 to move downward. Consequently, the movable member 120 is rotated around the rotating shaft 126 and is gradually inclined.

FIG. 17 shows a state in which the sliding plate 123 is moved most forward. In this state, the movable member 120 is inclined into an almost horizontal state. When the state shown in FIG. 17 is brought, the DVD insertion port 115, the CD insertion port 116 and the cassette tape insertion port 117 of the first frame member 114 which has been closed by the movable member 120 are exposed and opened so that a DVD 127, a CD 128, a cassette tape 129 and thing like can be inserted and ejected.

Figure 18:
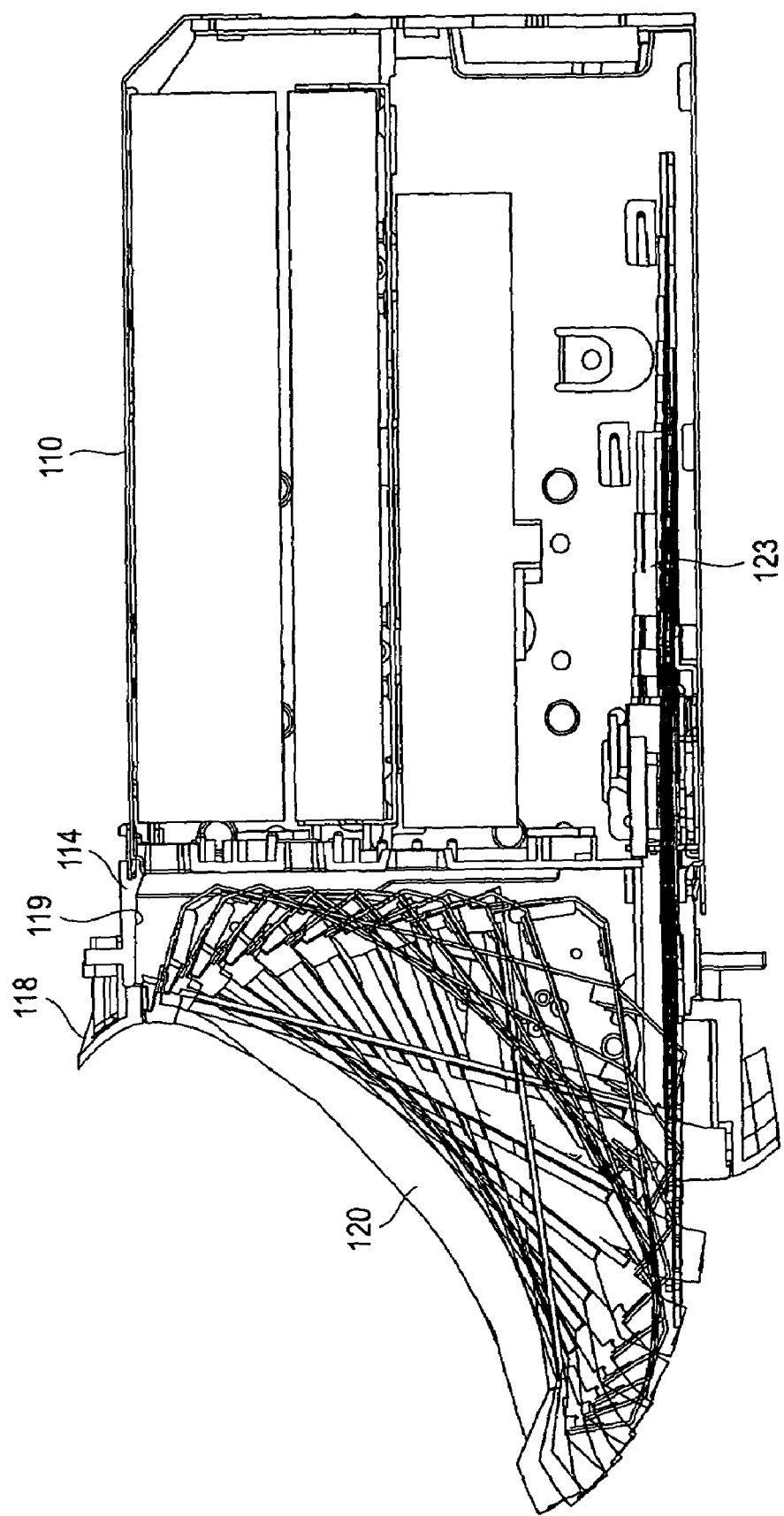
FIG. 18 is a view showing the moving process of a movable member according to the sixth embodiment.

FIG. 18 shows the moving process of the movable member 120 stepwise. As described above, the rotating shaft 126 is moved forward by the driving operation of the sliding plate 123 and the sliding shaft 122 is moved along the guide groove 121, so that the movable member 120 is rotated around the rotating shaft 126, and at the same time, the lower part is moved forward. Thus, the movable member 120 achieves a state opened. By this structure, the movable member 120 constituting the front panel of the on-vehicle acoustic apparatus can be opened and closed.

In the sixth embodiment, in the process from the state of FIG. 15 to the state of FIG. 17, the rotating shaft 126 of the movable member 120 moves forward with a slide of the sliding plate 123. At this time, the movable member 120 is rotated clockwise in FIG. 15 around the rotating shaft 126. Consequently, the positional relationship of A≧B is always held for the points A and B. For this reason, the top (point B) of the upper end of the front surface is not displaced upward when the movable member 120 is rotated. That is, the top is not displaced in a positive direction (an upward direction) but a negative direction (a downward direction) of a Y direction of FIG. 15, in a process that the movable member 120 is rotated.

Figure 19:
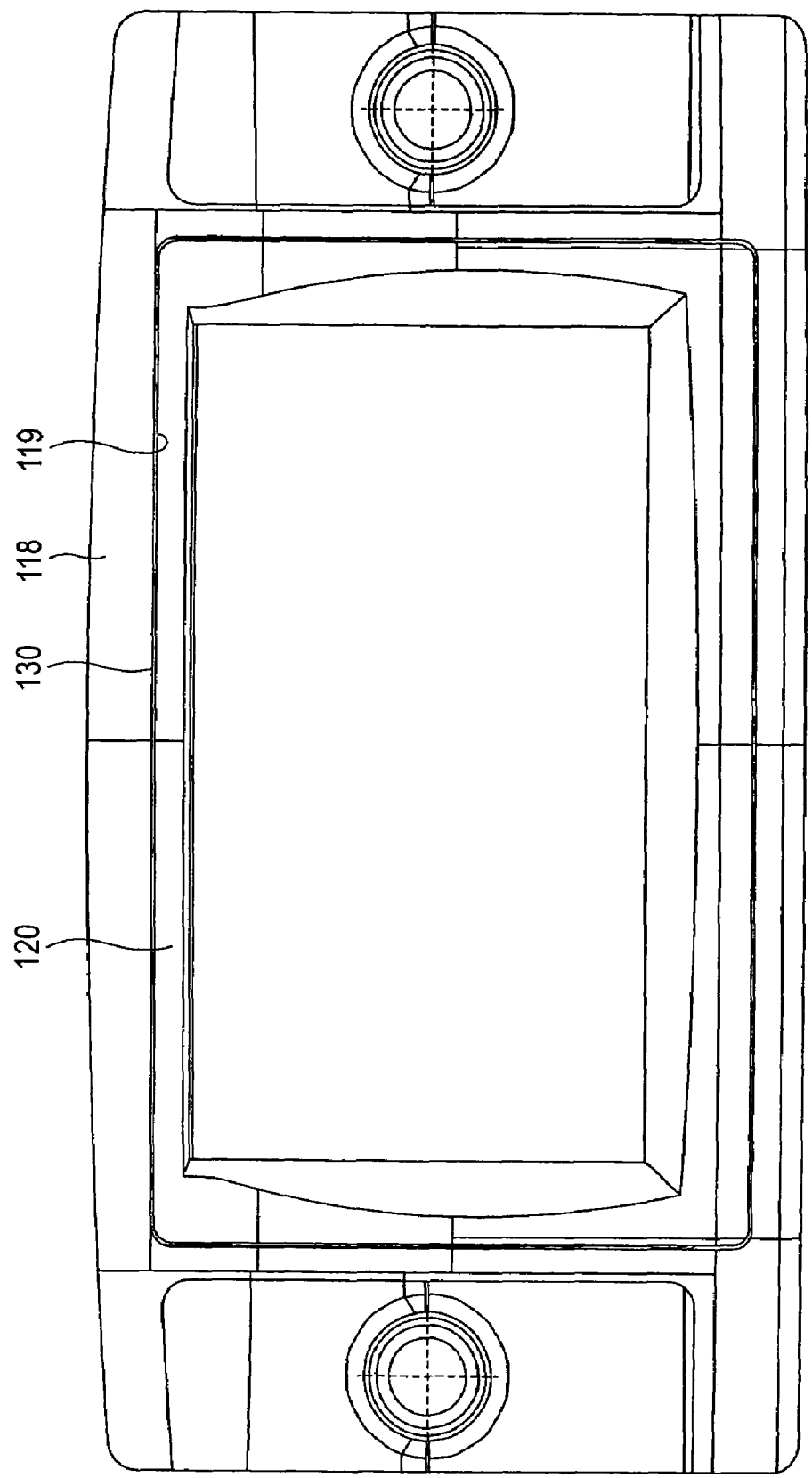
FIG. 19 is a front view showing the structure of the front surface of the on-vehicle acoustic apparatus according to the sixth embodiment.
Figure 20:
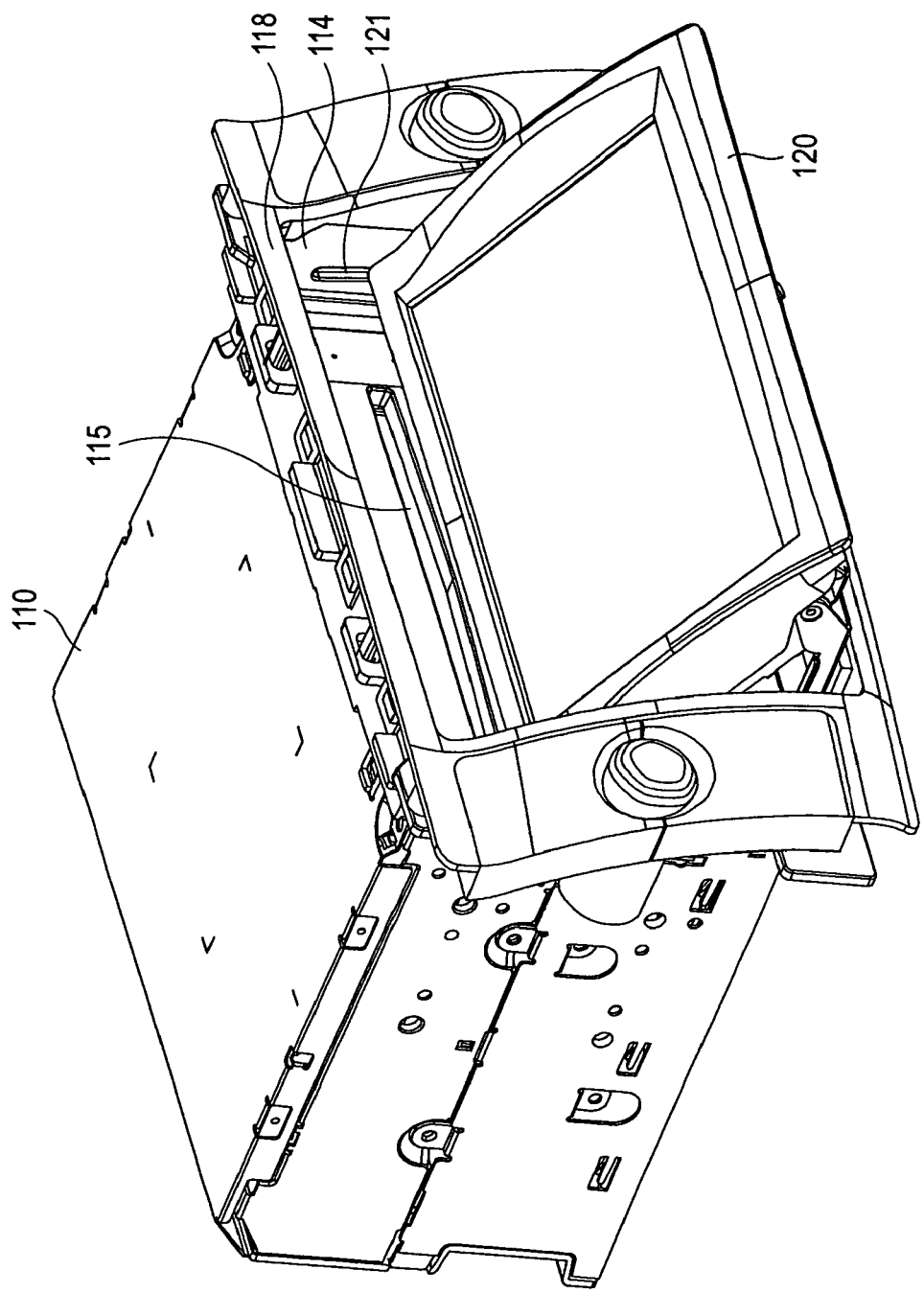
FIG. 20 is a perspective view showing the structure of the appearance of the on-vehicle acoustic apparatus according to the sixth embodiment.
Figure 21:
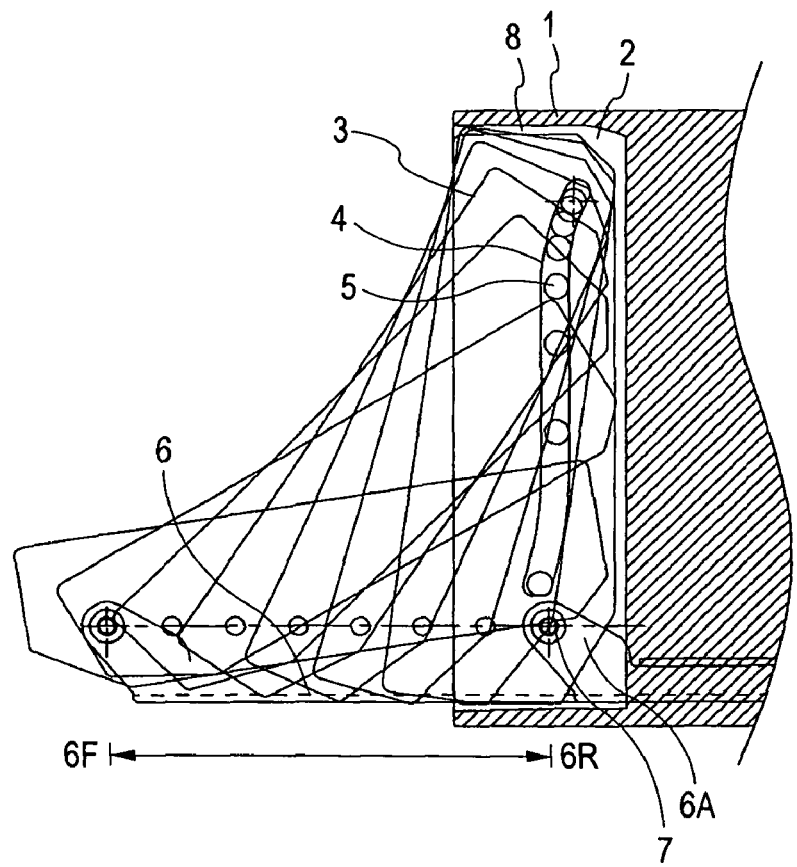
FIG. 21 is a view showing the moving process of a movable member according to a conventional example.
Figure 22:
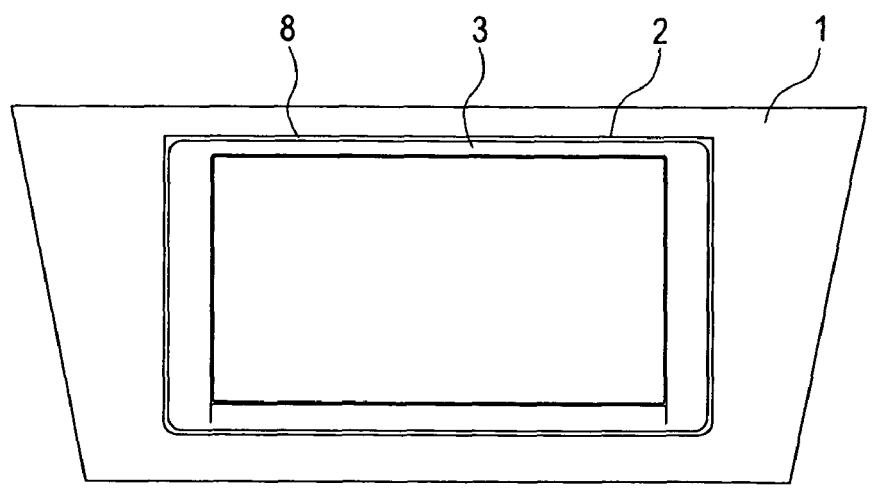
FIG. 22 is a front view showing the conventional example.

FIG. 19 is a front view showing the structure of the front surface of the on-vehicle acoustic apparatus according to the sixth embodiment. Moreover, FIG. 20 is a perspective view showing the structure of the appearance of the on-vehicle acoustic apparatus in the state of FIG. 16. According to the structure of the sixth embodiment, if a clearance 130 between the internal wall surface of the concave portion 119 built by the first frame member 114 and the second frame member 118 and the outer peripheral surface of the movable member 120 is reduced, even if the clearance 130 is scarcely formed, the upper end of the front surface of the movable member 120 can be prevented from hitting on the first frame member 114 and the second frame member 118. When the movable member 120 is rotated, accordingly, the upper end face and lower end face of the movable member 120 do not abut on the internal wall surface of the concave portion 119 of the frame members 114 and 118 so that the rotation of the movable member 120 is not hindered. Consequently, the clearance 130 between the first frame member 114 as well as second frame member 118 and the movable member 120 can be greatly reduced (for example, 0.1 mm, theoretically almost zero).

When the motor 124 is reversely rotated in the state shown in FIG. 17, the sliding plate 123 is moved backward and the rotating shaft 126 is correspondingly moved backward, so that the sliding shaft 122 is guided by the guide groove 121 and is thus moved upward. Consequently, the movable member 120 is rotated around the rotating shaft 126 and is gradually erected so that the state shown in FIG. 15 is brought.

As described above, according to the sixth embodiment, in the state that the movable member 120 is most erected, the positional relationship between the point A where the rotating shaft 126 is positioned and the point B where the top of the upper end of the front surface of the movable member 120 is positioned is set such that the point A and the point B are placed in the same position or the point A is positioned forward from the point B (A≧B) in the forward or backward direction of the on-vehicle acoustic apparatus body. Even if the clearance between the first frame member 114 as well as second frame member 118 and the movable member 120 is reduced, consequently, the movable member 120 can be rotated and the clearance 130 between the movable member 120 and the frame members 114 and 118 can be greatly reduced. Accordingly, it is possible to have such an advantage that a foreign substance, for example, dust can be prevented from entering through the clearance 130 and to enhance the grade of the interior of a car.

In summary, the electronic apparatus according to the first to sixth embodiments has such an advantage that the clearance between the movable member and the apparatus body such as the frame member can be reduced and is available for an electronic apparatus to be used for an on-vehicle video acoustic apparatus.

What is claimed is:

1. An electronic apparatus comprising:
    a frame member attached to a front part of an apparatus body;
    a movable member accommodated inside the frame member; and
    driving means for moving the movable member,
    wherein the movable member is rotated around a first shaft, and
    wherein an initial movement from an accommodation position inside the frame member of the movable member by the driving means has a movement component in a forward direction with respect to the apparatus body at a position of the first shaft and a position of a front end of the movable member, which is at an opposite end and side to the first shaft,
    wherein the first shaft and the front end of the movable member initially move in parallel with each other, when the movable member moves from the accommodation position,
    wherein the driving means includes a sliding member for moving a lower part of the movable member in forward and backward directions, and
    the first shaft is rotatably coupled to the sliding member,
    wherein the movable member has a second shaft in both side portions, and
    the frame member has a guide groove for slidably guiding the second shaft.

2. The electronic apparatus according to claim 1, further comprising:
    energizing means for forward energizing the second shaft side of the movable member in the accommodation position.

3. The electronic apparatus according to claim 2,
    wherein the energizing means is a spring member.

4. The electronic apparatus according to claim 1,
    wherein the guide groove has an upper end for guiding the second shaft in a forward direction with respect to the apparatus body.

5. The electronic apparatus according to claim 1,
    wherein the driving means includes a sliding member for moving a lower part of the movable member in forward and backward directions,
    the first shaft is rotatably coupled to the sliding member,
    the movable member has a second shaft in both side portions,
    the frame member has a guide groove for slidably guiding the second shaft, and
    the front end of the movable member, the second shaft, and the first shaft are positioned from a forward side to a rearward side of the apparatus body in this order.

6. The electronic apparatus according to claim 1,
    wherein the guide groove has a substantially horizontal upper end for guiding the second shaft in a forward direction with respect to the apparatus body.

7. The electronic apparatus according to claim 1,
    wherein a clearance between the frame member and the movable member is sufficiently small to make the frame member and the movable member look integral.

8. An electronic apparatus comprising:
    a frame member attached to a front part of an apparatus body;
    a movable member accommodated inside the frame member; and driving means for moving the movable member, wherein the movable member is rotated around a first shaft, and wherein an initial movement from an accommodation position inside the frame member of the movable member by the driving means has a movement component in a forward direction with respect to the apparatus body at a position of the first shaft and a position of a front end of the movable member, which is at an opposite end and side to the first shaft, wherein the first shaft and the front end of the movable member initially move in parallel with each other, when the movable member moves from the accommodation position, wherein the driving means includes a sliding member for moving a lower part of the movable member in forward and backward directions, and the first shaft is rotatably coupled to the sliding member, wherein the movable member has a second shaft in both side portions, and the frame member has a first guide groove for slidably guiding the second shaft, wherein the movable member has a projection, the frame member has a second guide groove in a position corresponding to the projection of an internal wall surface, and the projection is inserted into the second guide groove when the movable member comes to be accommodated.

9. The electronic apparatus according to claim 8, further comprising:

a rubber pad on an opposed surface of the second guide groove.

10. A movable member driving method in an electronic apparatus comprising a frame member attached to a front part of an apparatus body, a movable member accommodated inside the frame member to be rotated around a first shaft, and driving means for moving the movable member, when the movable member moves from an accommodation position inside the frame member, comprising the steps of:

moving the first shaft and a front end of the movable member, which is at an opposite end and side to the first shaft, in a forward direction with respect to the front part of the apparatus body; and rotating the movable member around the first shaft, wherein the first shaft and the front end of the movable member initially move in parallel with each other, when the movable member moves from the accommodation position, wherein the driving means includes a sliding member for moving a lower part of the movable member in forward and backward directions, and the first shaft is rotatably coupled to the sliding member, wherein the movable member has a second shaft in both side portions, and the frame member has a guide groove for slidably guiding the second shaft.

11. The electronic apparatus according to claim 10, wherein the guide groove has a substantially horizontal upper end for guiding the second shaft in a forward direction with respect to the apparatus body.

12. The electronic apparatus according to claim 10, wherein a clearance between the frame member and the movable member is sufficiently small to make the frame member and the movable member look integral.

13. A movable member positioning method in an electronic apparatus comprising a frame member attached to a front part of an apparatus body, a movable member accommodated inside the frame member to be rotated around a first shaft, and driving means for moving the movable member, with using a jig having parallel protruded pieces to abut on an inside surface of the frame member, comprising the steps of:

inserting the protruded pieces of the jig into the frame member from a front of the frame member;

inserting the apparatus body including the movable member between the protruded pieces from a rear of the frame member;

positioning the movable member with respect to the frame member; and fixing the apparatus body and the frame member.

14. An electronic apparatus comprising:

a frame member attached to a front part of an apparatus body;

a movable member movably supported on an inside of the frame member; and driving means for driving the movable member, wherein the movable member is rotated while a lower part of the movable member moves in forward and backward directions of the apparatus body by a driving operation of the driving means to open and close the front part of the apparatus body, and an upper end is displaced in only a downward direction in a vertical direction of the apparatus body when the movable member in the most erected state is rotated, wherein a rotating shaft of the movable member is positioned in the same place as a top of an upper end of a front surface of the movable member or is positioned forward therefrom in the forward and backward directions of the apparatus body in a condition when the movable member is set in the most erected state.

15. The electronic apparatus according to claim 14, wherein the movable member has a sliding shaft provided on an upper side of both side portions, and the rotating shaft provided on a lower side of the both side portions, the frame member has a guide groove to be inserted the sliding shaft of the movable member and guiding the sliding shaft, and the driving means includes a sliding member coupled to the rotating shaft of the movable member and driving the rotating shaft in the forward and backward directions of the apparatus body.

16. An electronic apparatus comprising:

a frame member attached to a front part of an apparatus body;

a movable member accommodated in the frame member; and driving means for moving the movable member, wherein the movable member is rotated around a first shaft, the movable member moves by a driving operation of the driving means from a position where the movable member is accommodated in a forward direction with respect to the apparatus body in a position of the first shaft, wherein the rotating shaft of the movable member is positioned in the same place as a top of an upper end of a front surface of the movable member or is positioned forward therefrom in the forward and backward directions of the apparatus body in a condition when the movable member is set in the most erected state, and a component in a direction orthogonal to the forward direction in a position of a front end which is opposite to the first shaft is set in a direction of the first shaft side.

17. The electronic apparatus according to claim 16, wherein the driving means includes a sliding member for moving a lower part of the apparatus body in forward and backward directions, and
the first shaft is rotatably coupled to the sliding member.

18. The electronic apparatus according to claim 16, wherein the movable member has a second shaft in both side portions, and
the frame member has a guide groove for slidably guiding the second shaft.

19. The electronic apparatus according to claim 16, wherein the driving means includes a sliding member for moving a lower part of the apparatus body in forward and backward directions,
the first shaft is rotatably coupled to the sliding member,
the movable member has a second shaft in both side portions,
the frame member has a guide groove for slidably guiding the second shaft, and
the first shaft, the front end of the movable member, and the second shaft are positioned from a forward side to a rearward side of the apparatus body in this order.

* * * * *